Jan. 22, 1957  L. E. BRATZ, SR  2,778,143
FISHING PLUG
Filed Feb. 14, 1955
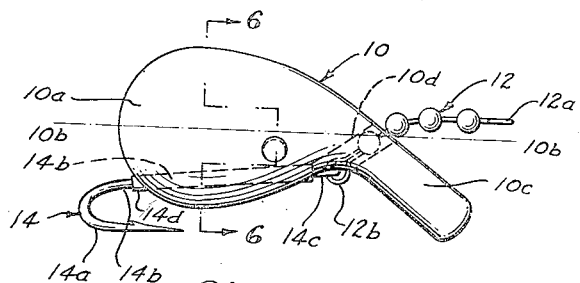
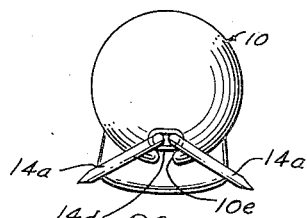
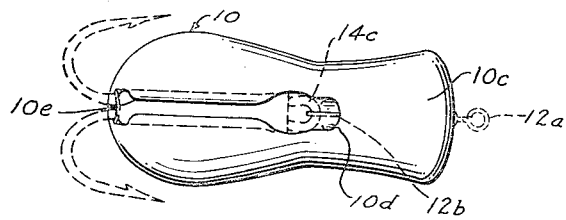
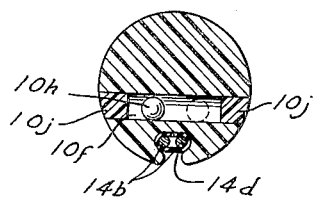
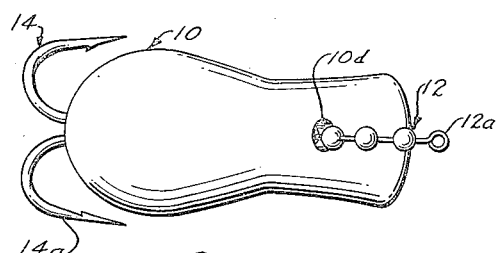
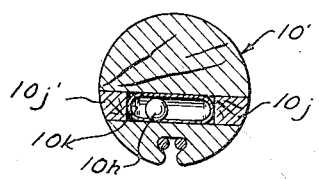
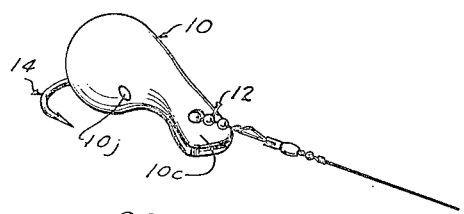
INVENTOR.
LOUIS E. BRATZ SR.
BY
Reynolds, Beach & Christensen
ATTORNEYS A# United States Patent Office 2,778,143
Patented Jan. 22, 1957

2,778,143

FISHING PLUG

Louis E. Bratz, Sr., Seattle, Wash.

Application February 14, 1955, Serial No. 487,947

11 Claims. (Cl. 43—42.05)

This invention relates to improvements in fishing plugs and is herein illustratively described by reference to its presently preferred form as devised for steelhead fishing in the streams of the Pacific Northwest. However, it will be recognized that the invention in its broader aspects is not necessarily limited to the illustrative details nor to the disclosed application thereof.

A plug type fishing lure which will wobble effectively in relatively slow-moving water as well as in fast water is desirable for steelhead fishing. The steelhead trout can be taken at times in deep pools or channels where the water moves very slowly, and at other times, in fast riffles. Many lures which wobble effectively in fast water will not respond in slow water, whereas those which are effective under the latter conditions will wobble so violently in fast water that the lure will surface or give the appearance of a mere blur, not likely to attract the fish.

An object of the present invention is to provide a lure which operates effectively under various conditions as described above.

Another object of the invention is such a fishing plug having an improved rigging arrangement for the drag connector and hook assembly of the type permitting run-up of the plug body on the line following release of the hook from the plug body by the strike of a fish.

Still another object is a fishing plug achieving the foregoing objectives in a simple manner, minimizing costs of manufacture and facilitating manipulation (i. e. assembly and disassembly) of the detachable components. A related object is such a fishing plug wherein the hook and drag connector assembly are quickly and easily removable and replaceable from and on the plug body so as to permit changing of hooks or lure bodies in order to experiment with different combinations without appreciable time loss, and under conditions wherein the fingers, often numb from the cold, would experience difficulty in manipulating complicated rigging arrangements.

Still another object of the invention is a fishing plug of the described type, the body of which may be manufactured of wood, plastic or similar substance without necessity of embedding drag connector elements therein, which would add to the manufacturing costs and tend to weaken the lure structure as in previous types of lures.

With these and other objects in view as will hereinafter more fully appear, the present invention resides in certain features and combinations as will be apparent from the following detailed description thereof by reference to the accompanying drawings illustrating the preferred form thereof.

Figure 1 is a side view of the improved fishing plug.

Figure 2 is a rear end view of said fishing plug.

Figure 3 is a top view of said fishing plug.

Figure 4 is a perspective view of the fishing plug with a fishing line connected to the same.

Figure 5 is a bottom view of the plug body, with the hook and drag connector assembly shown by dotted lines.

Figure 6 is a transverse sectional view taken on 6—6 of Figure 1.

Figure 7 is a view similar to Figure 6 of a modified construction.

The plug body 10 is of generally elongated form. The bulbous tail portion 10a is approximately pear shaped and tapers in diameter forwardly over the major portion of its length, with the tail end thereof being convexly rounded on a radius substantially equal to the maximum or greatcircle radius of the tail portion in a transverse plane perpendicular to the longitudinal axis 10b—10b of such tail portion. The nose portion 10c constitutes, in effect, a flattened and obliquely inclined forward extension of the tail portion. The general plane of the nose portion 10c forms an acute angle with the axis 10b—10b. The nose portion and tail portion merge smoothly together. In side view the top of the nose portion and the top of the tail portion form a gradual convex arcuate curve whereas the mergence of the two portions at the bottom of the lure forms a more abrupt, upwardly arched curve. Although the thickness, measured vertically, of the nose portion remains substantially uniform throughout its length from its tip to the neck or point of mergence with the tail portion, the width of such nose portion, as viewed in plan, increases somewhat from the neck to the front end of the nose portion. The divergence angle defining the rearwardly tapering width variation of the nose portion is preferably of the order of 10 degrees. As shown in Figures 3 and 5, the front end of the nose portion is preferably rounded on a circular arc concentric with the drag connector aperture in the top side of the plug body.

The drag connector aperture mentioned above is formed by the diagonal bore 10d extending generally in the vertical longitudinal midplane of the plug body through the nose portion near the root thereof. The aperture formed by this bore in the top of the plug body is located slightly forwardly of the neck formed by the merging nose and tail portions, whereas the aperture in the bottom side of the body is located substantially at the neck, thereby imparting to the bore axis a substantial inclination (about 45 degrees) relative to the body axis 10b—10b. The bore constitutes a reeveway for the line or drag connector to be described.

The plug body is also formed with a central longitudinal groove 10e in the bottom side thereof, which groove is open at both ends and has a bottom extending generally parallel to the axis 10b—10b. The forward end of the groove is situated just rearwardly of the bottom aperture of the bore 10d, whereas the rear end of the groove opens through the tail end of the plug body as shown. As illustrated in Figures 2 and 6, the groove tapes outwardly in width from its base to its entrance, and has sufficient depth to accommodate the shank portion of a fish hook in a manner to be described.

Preferably, a drag connector is used with the fishing plug and is fastened at one end to the eye of the hook, from which it extends upwardly and forwardly through the bore or reeveway 10d for connection of its opposite end to the fishing line or leader. The preferred type of drag connection is the illustrated bead chain swivel 12 of the well known type comprising a series of hollow metal balls interconnected by links for independent relative swiveling, and with the endmost balls having swivel eyes 12a and 12b, respectively, connected thereto. The swivel eye 12a, namely that connected to the upper end of the drag link 12, is sufficiently small to pass freely through the bore 10d, as are the balls themselves.

The preferred type of hook incorporated in the fishing plug is the twin gang hook 14, having hook elements 14a extending in divergent directions (approximately 120 degrees apart) from their respective supporting shanks 14b joined together by the hook eye 14c. For purposes of the invention, the twin gang hook used is preferably and more specifically of the type wherein the two tines or shank elements of the hook extend in generally parallel, normally spaced-apart relationship from the interconnecting eye 14c, and the eye portion serves as a spring tending to maintain such shank elements in that relationship. Thus, the drag connector eye 12b may be installed on the hook eye 14c by slipping it over the end of one of the hooks and along the length of the associated shank element until it lodges in the base of the hook eye. In the preferred embodiment, a flexible rubber sleeve 14d is slipped on the hook shank, by passing it successively over the drag connector 12 and the hook eye 14c until it snugly encircles the two shank elements 14b. This rubber sleeve serves two purposes in the fishing plug. First and foremost, it improves the retentive engagement by which the shank portion of the hook 14 is held in the base of the retaining groove 10e by compression and frictional contact thereof with the side walls of the groove. Tight gripping of the hook shank in the groove base is accomplished by turning the hook about the shank axis so that the common plane of the shank elements 14d extend generally parallel to the base plane of the groove, namely, horizontally as viewed in Figures 1 and 2. The second function of the rubber sleeve thus installed on the assembly of the gang hook and the drag connector is to preclude any possibility of release or unthreading of the hook from the drag connector eye 12b after a fish has been hooked and the plug body released to run up the fishing line.

The manner of effecting retentive engagement of the sleeve-encircling hook shank elements 14b is illustrated best in Figure 6, wherein the shank portion is lodged in the base of the groove in the position previously described. It will be noted that in this position of the hook shank the restriction formed at the groove entrance locks the hook shank in the groove against direct outward displacement thereof due to the fact that the width of the groove at its entrance is less than the combined maximum width of the sleeve-encircled shank elements 14b. Thus, in order to insert the hook shank portion into the groove by lateral movement of one relative to the other, it is necessary to orient the common plane of the shank elements into generally perpendicular relationship to the base plane of the groove, and during insertion, after the shank has passed the restricted groove entrance, the hook is then twisted about the shank axis until it occupies the illustrated position wherein it is frictionally held against dislodgement by the normal forces acting thereon. However, when a fish strikes and becomes caught on one of the hook elements, the resulting twisting and turning movements of the fish create leverages which almost inevitably twist the hook relative to the plug body, hence, release the hook from the plug body to permit free run-up thereof on the fishing line as desired.

In the modification shown in Figure 7, the sleeve is omitted and reliance is placed entirely upon the resilience of the hook eye portion 14c to effect resilient gripping, hence, retentive engagement of the hook shank between the groove walls.

In the embodiment shown in Figures 1 through 7, the plug body is molded of a suitable plastic material which is preferably of the buoyant type, thereby causing the lure to float with the correct attitude in the water. The bulbous tail portion 10a of the plug body has a sufficient buoyancy which, when combined with the downward planing action of the nose portion 10c, carries the weight of the hook 14 so as to maintain the latter in generally horizontally extending position, and so as to present the top surfaces of the lure generally frontally to the oncoming water currents and thereby subject the lure to maximum wobble-producing forces, especially in slow water. In the embodiment shown in Figure 7, the lure body 10' is formed of buoyant wood.

In order to improve the effective wobble action of the lure in slow water, the tail portion of the lure body has a transverse bore 10f situated slightly below the axis 10b and approximately in a longitudinally (of the lure) centered position. A heavy metal ball 10h is received in this bore and is free to roll back and forth therein accompanying sidewise tipping of the plug body or lateral acceleration thereof. The ends of the bore 10f are sealed by plastic plugs 10j in Figure 6, and by the wooden plugs 10j' in Figure 7. However, since, in the case of a wooden plug body as in Figure 7, it is difficult to form a smooth bore to permit completely free movement of the ball 10h' therein, it is preferable to encapsulate the ball in an elongated plastic tube 10k in which the ball rolls freely. The capsule is then retained in the plug body bore by the sealing plugs 10j'.

By locating the guide bore 10f in the position shown, it is found that the freely moving ball 10h tends to amplify the lure action in slow-moving water because of the shifting unbalance effect thereof causing tilting of the plug body first to one side and then to the other. Such an arrangement also tends to prevent excessively violent wobbling of the lure in very fast water, due to the damping action of the moving ball. Also, it is believed that the audible clicking noise of the ball moving back and forth in the groove attracts fish.

Thus, the provision of the guide bore and free-moving ball therein improves the action of the lure and is therefore a desirable feature therein cooperating with the shape of the lure and the balanced hook arrangement to produce a versatile fish-getting artificial lure.

I claim as my invention:

1. A fishing plug comprising a plug body of generally elongated form normally disposed generally horizontally with one side constituting the top thereof, said plug body having a bore extending from a top location near the front end thereof to a bottom location at least as far rearwardly from said front end as said top location, said plug body having a hook-retaining groove in the bottom thereof extending longitudinally from a location rearwardly of said bottom location through the rear end of said plug body, both ends of said groove being open for the reception of the shank portion of a fish hook extending lengthwise therethrough, a line connector passed slidably through the bore of said plug body, the upper end of said line connector being adapted to be connected to a fishing line and being sufficiently small to pass through said bore to permit run-up of said plug body on the fishing line, and a fish hook having at least one hook element, an eye fastened to the lower end of said line connector, and an elongated shank portion interconnecting said eye and said hook element, said shank portion being resiliently compressible transversely of said shank portion, said resiliently compressible shank portion being retentively engageable in said groove by pressing the same laterally into said groove to be compressed and held by friction between opposite side walls of said groove, said fish hook being releasable from said groove by the strike of a fish to free the plug body for run-up thereof on the fishing line.

2. The fishing plug defined in claim 1, wherein the plug body has a generally transverse bore therein located generally intermediate the front and rear ends thereof, and a relatively heavy metal ball received in said bore and of a smaller diameter than said bore to permit free rolling of said ball lengthwise therein, the ends of said bore being closed to trap said ball in said plug body.

3. The fishing plug defined in claim 2, wherein the plug body comprises a generally round bulbous tail portion having the hook-retaining groove in the bottom thereof, and a relatively long and flat nose portion inclined downwardly and forwardly in relation to the longitudinal axis of the plug body, the width of said nose portion being of the same order as the maximum diameter of said tail portion, the bore in the plug body being located slightly forwardly of the tail portion.

4. The fishing plug defined in claim 3 wherein at least the tail portion of the plug body is formed of buoyant material whereby the combined downward planning action of the nose portion and the buoyancy of the bulbous tail portion maintain the hook carried thereby in relatively elevated position during forward movement of the fishing plug in the water.

5. A fishing plug adapted to be drawn through water by a drag element, said plug comprising a body of generally elongated form normally disposed generally horizontally with one side constituting the top thereof, said plug body having a bore extended from a top location near the front end thereof to a bottom location to pass the drag element therethrough, said body having a hook-retaining groove in the bottom thereof extending longitudinally from a location in the vicinity of said bottom location and through the rear of said plug body, both ends of said groove being open for the reception of the shank portion of a fish hook extending lengthwise therein, a fish hook having an eye adapted to be fastened to the drag element passed through said bore, and an elongated shank portion, said shank portion being resiliently compressible transversely thereof, said resiliently compressible shank portion being retentively engageable in said groove by pressing the same laterally into said groove to be compressed and held by friction between opposite sides thereof.

6. The fishing plug defined in claim 5, wherein the fish hook comprises a gang hook having two divergently projecting hook elements and having a shank portion comprising elongated shank elements extending in a common plane in generally parallel relationship between the hook eye and the respective hook elements, said shank elements being normally separated and being resiliently deflectable toward each other by insertion thereof into said groove with the hook revolved about its shank axis to dispose said common plane thereof generally parallel to the groove base, said groove being of materially reduced width above the base thereof, whereby insertion and removal of the hook shank portion by movement thereof laterally in relation to said groove is facilitated by turning the hook about its shank axis until the common plane of said shank elements lies generally perpendicular to said groove base.

7. The fishing plug defined in claim 5, wherein the fish hook comprises a gang hook having two divergently projecting hook elements and a shank portion comprising two elongated shank elements extending in a common plane and in generally parallel relationship from the hook eye to the respective hook elements, a sleeve of resiliently flexible frictional material encircling said shank elements, the overall width of said sleeve-encircled shank elements in the common plane of the latter being normally slightly greater than the width of said groove at the base thereof.

8. The fishing plug defined in claim 7, and a drag element comprising a chain including a series of elements successively interconnected by independent swivel means, said chain having a lower end connected to the eye of the fish hook and having a coupling element at the upper end thereof adapted for connection to a fishing line, said swiveled elements and said coupling element being adapted to pass freely through the bore in the plug body to permit free run-up of the latter on the fishing line when the fish hook is disengaged from the retaining groove by the strike of a fish.

9. The fishing plug defined in claim 8, wherein the plug body has a transverse bore therein generally intermediate the ends of said plug body, and a relatively heavy weight element received in said bore to move transversely back and forth therein accompanying lateral oscillation of said plug body.

10. A fishing plug comprising a plug body having a bulbous, forwardly tapering, pear-shaped tail portion and a relatively flat and wide nose portion inclined obliquely to the longitudinal axis of said tail portion, said plug body having a bore extending from a generally intermediate location on the side of said nose portion nearest said axis to the opposite side thereof at a location near the juncture between said nose portion and said tail portion, said tail portion having a groove extending lengthwise thereof on the latter side of said plug body from a location generally aligned with and spaced rearwardly from the last-mentioned end of said bore to the rear end of said plug body, said groove being tapered in width outwardly from the base thereof for retentive frictional engagement of a fish hook shank therein, a drag element adapted to pass slidably through said bore, and a gang hook having an eye secured to the drag element and having an elongated shank portion, said shank portion being resiliently compressible transversely thereof by insertion of said shank portion wedgingly into said groove, whereby the hooks project rearwardly and outwardly from the plug body.

11. The fishing plug defined in claim 10, wherein the gang hook includes two diversely extending hook elements joined to longitudinally extending shank elements disposed in separated spaced-apart relationship in a common plane, and a resilient rubber sleeve snugly encircling said shank elements, the minimum thickness of said sleeve-encircled shank elements being less than the minimum width of said groove, and the maximum thickness of said sleeve-encircled shank elements being greater than said minimum groove width, whereby insertion and removal of said gang hook shank into said groove laterally thereof requires orientation of said general plane approximately perpendicular to the plane of the base of said groove, whereas maximum retentive compression of said hook shank between the groove walls requires reorientation of said common plane into substantially parallel relationship with said groove base plane.

References Cited in the file of this patent

UNITED STATES PATENTS

| | | |
|---|---|---|
| 997,820 | Holmquist | July 11, 1911 |
| 1,870,559 | Drake | Aug. 9, 1932 |
| 2,225,676 | White | Dec. 24, 1940 |
| 2,236,353 | Minser | Mar. 25, 1941 |

FOREIGN PATENTS

| | | |
|---|---|---|
| 81,897 | Norway | Feb. 20, 1952 |